United States Patent Office 2,799,138
Patented July 16, 1957

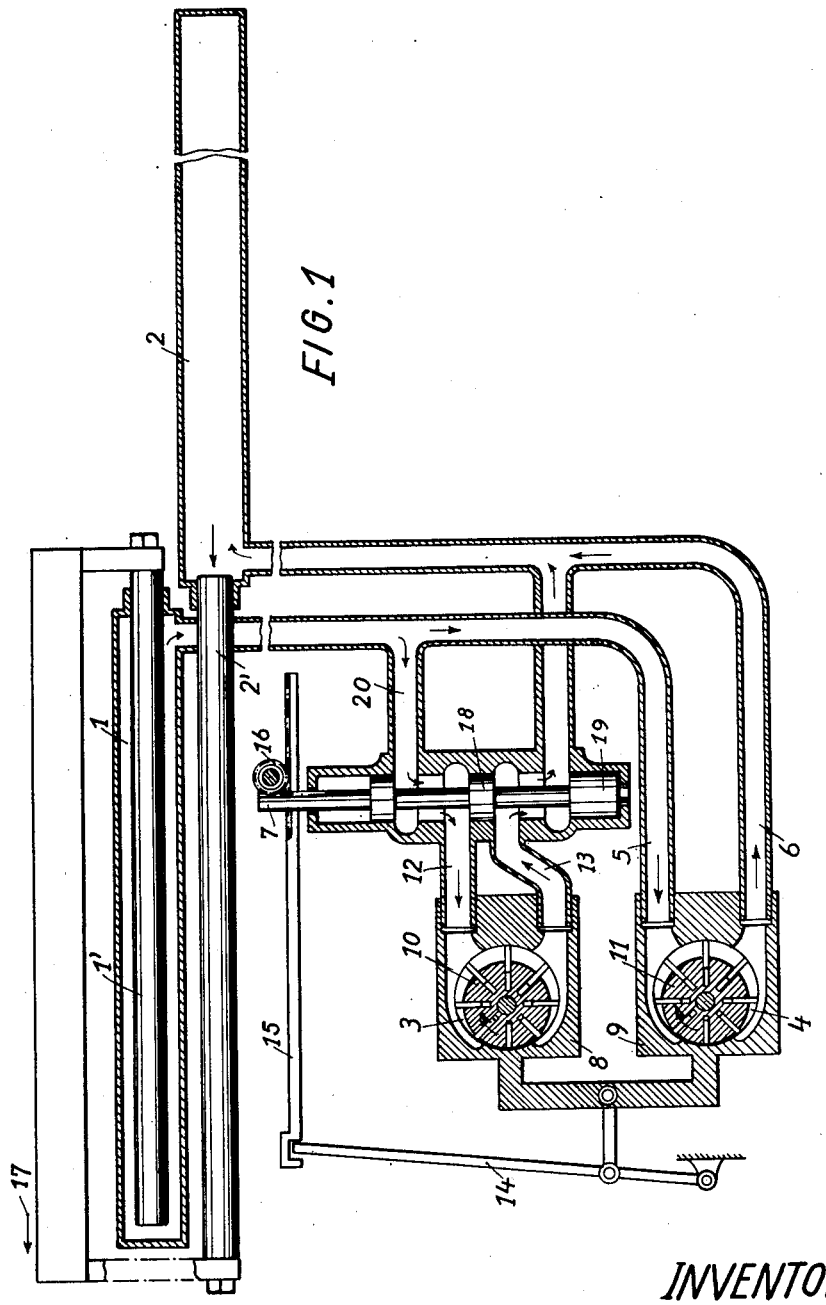

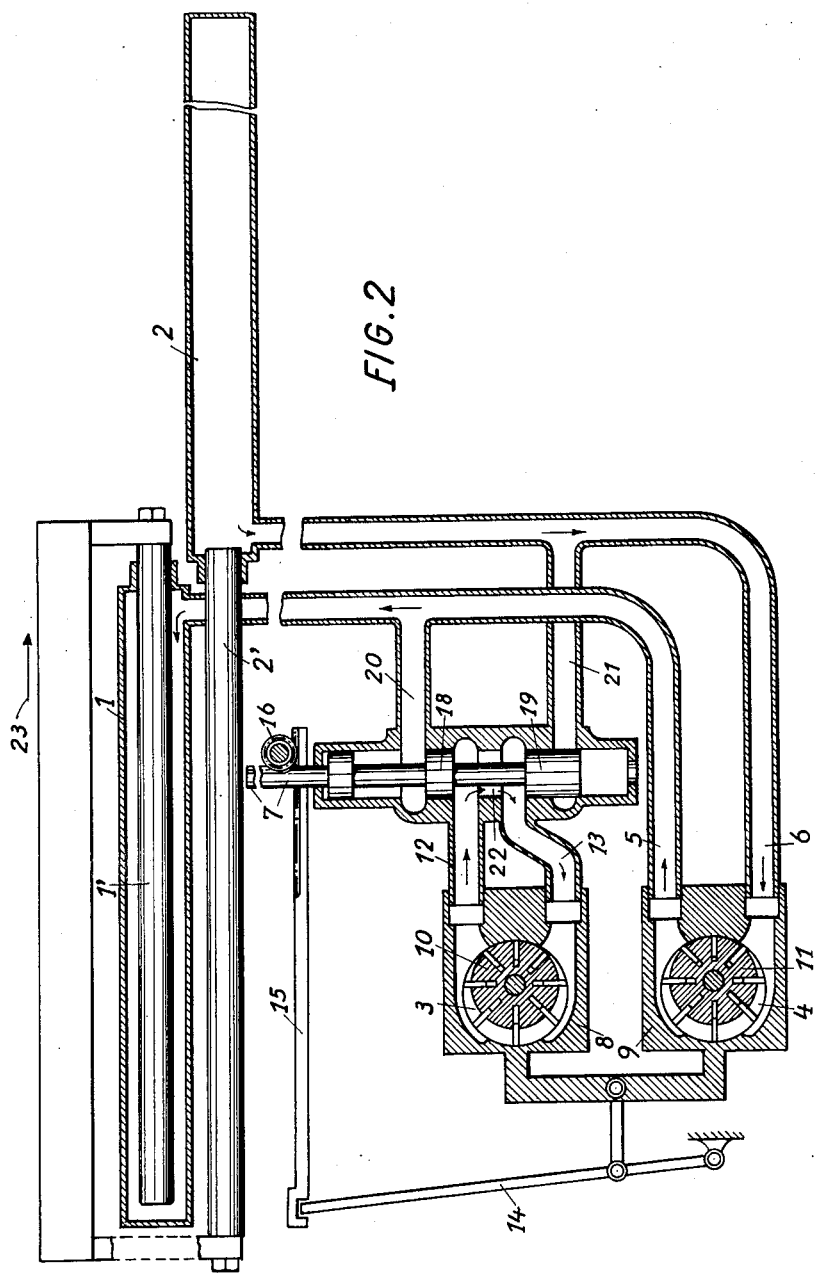

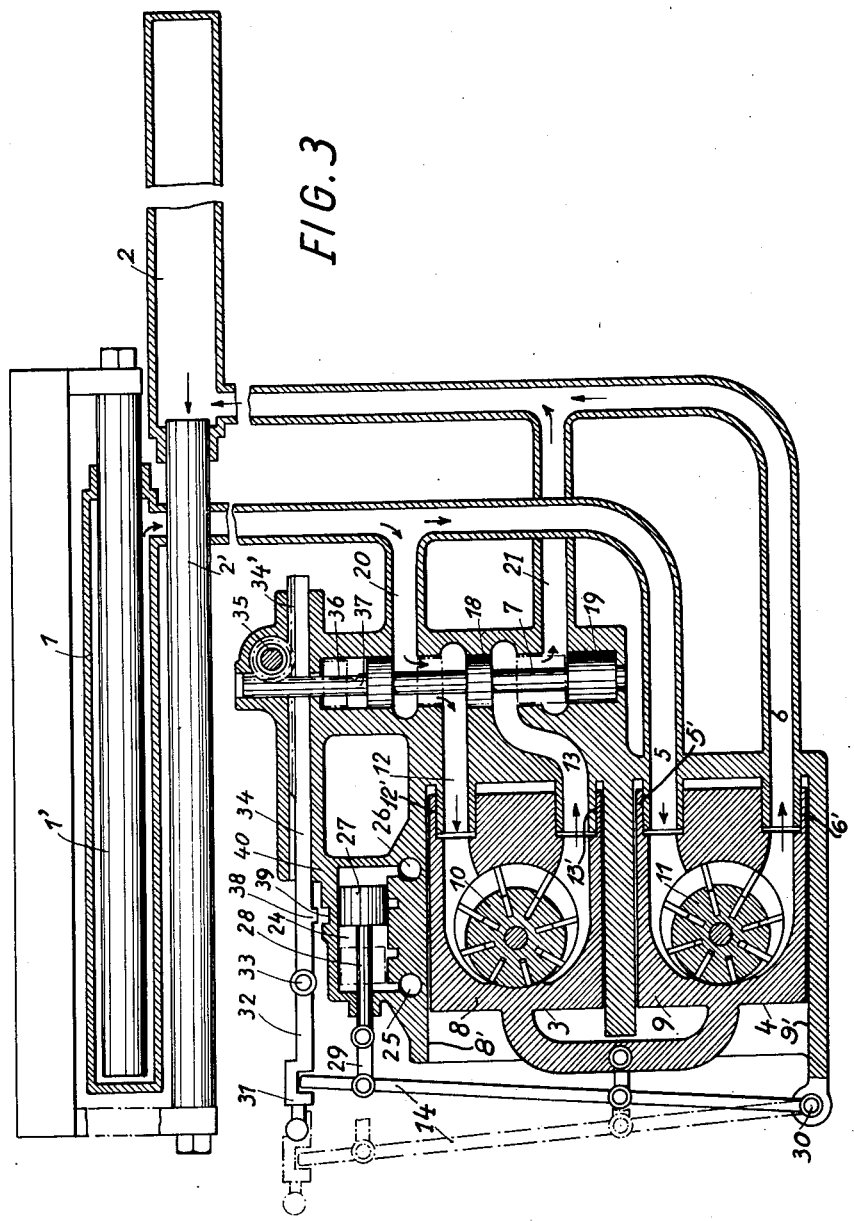

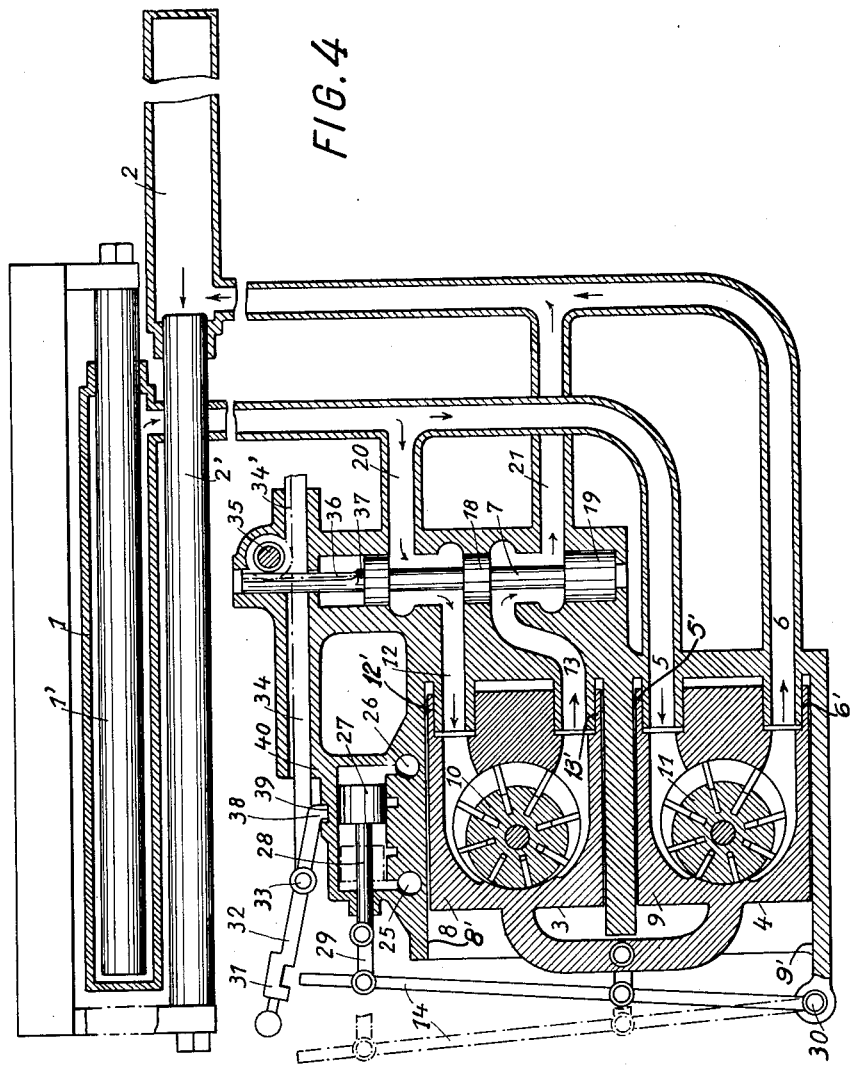

2,799,138

HYDRAULIC DRIVE FOR THE RECIPROCATING PARTS OF TOOL MACHINES HAVING A WIDE SPEED RANGE STEPLESSLY CONTROLLED

Ewald Dornhöfer, Coburg-Cortendorf, Germany, assignor to Werkzeugmaschinenfabrik Adolf Waldrich Coburg, Coburg, Germany Application July 8, 1953, Serial No. 366,665

Claims priority, application Germany July 10, 1952

7 Claims. (Cl. 60—52)

This invention concerns a method for the hydraulic drive of machine tools, for instance planing machines, with reciprocating table movement, and a hydraulic drive operating with the use of this method.

It is known that in the conveying work of rotating pumps, as a result of the necessary clearance between stationary and moving parts a slip loss takes place which is dependent, inter alia, on the pressure difference between the suction and pressure sides. In the case of hydraulic drive of the tables of machine tools, this slip loss has a particularly disadvantageous effect if when the table is being moved at a relatively low speed a sudden stress occurs, as is the case for instance when the machining tool comes into contact with the workpiece. What happens is that since the slip loss increases to a significant value as compared with the quantity of liquid being conveyed, a great decrease in speed takes place, even to such an extent that the required feed speed is no longer attained.

This disadvantage is removed by means of the invention. The method on which the invention is based consists in this, that instead of a single conveying pump which is by itself capable of the required output, two pumps working in parallel with one another are provided, of which the combined maximum output corresponds approximately to the peak output of the single pump. In the case of a smaller pump, as a result of the smaller slip due to its construction there is less reduction of speed, at relatively low table speeds, than in the case of a large pump. But since on the other hand a definite minimum quantity of conveyed liquid, at a definite pressure, must be made available, a plurality of pumps having a smaller output are provided.

A hydraulic drive operating in accordance with this method is preferably formed in such a manner that in the delivery duct of the hydraulic drive at least two pumps operating in parallel with one another are provided, which convey the liquid under pressure, necessary for moving the table, either separately or together, according to requirements. At low table speeds, for instance during the working stroke, one of the two pumps may be rendered inoperative so that only the other pump acts to produce the movement of the table. In this single pump the slip is then substantially less than in a large pump giving the same output, so that the great reduction of speed on the occurrence of a stress is avoided. In the return movement, on the other hand, both pumps preferably work together, and in parallel, so that the table moves back at a high speed.

Preferably the pumps are formed as rotary pumps which are continuously regulable, in both directions of flow, by displacement of the casing relatively to the rotor, and the casing parts are coupled together in such a manner that during regulation they are moved together over the same distance. In this arrangement, the construction of the regulating members is rendered particularly simple. But it is also possible to regulate the pumps separately.

The control of the pumps, moreover, is effected by means of a control mechanism, known per se, which is automatically brought into action by the movement of the table of the machine tool. The invention provides that a control slide causing one of the pumps to be rendered inoperative is adapted to be coupled with the automatically acting control mechanism of the pumps. In that case the manner of operation of the pumps is preferably such that during the working stroke, when the table speed is less, only one pump is operative. When the pumps are reversed so as to produce the return movement, simultaneously with this reversal the second pump also is connected to the delivery duct and thus renders possible a rapid return movement of the table.

Preferably the construction of the rod system acting on the slide, by means of which one pump can be rendered inoperative, is made such that this mechanism can either be coupled with the control mechanism for the pumps, or made stationary, according to requirements. The fixing or locking of the slide is in that case effected for instance by means of a lever of the transmission rod system, which lever is provided with a projection engaging in a corresponding recess in the pump casing.

When two pumps are provided, both may have the same dimensions. Alternatively, however, the pump adapted to be shut off from the delivery duct may be made larger than the other.

The invention is described in further detail hereinafter, with reference to two embodiments illustrated in the accompanying drawings, in which:

Figure 1 shows diagrammatically a hydraulic drive for a machine tool, with two pumps.

Figure 2 shows the same arrangement as Figure 1, but with one of the pumps shut off from the delivery duct.

Figure 3 shows a hydraulic drive like that of Figures 1 and 2, but with a different control mechanism, and Figure 4 shows the drive according to Figure 3, with the control slide locked.

In the drawings, 1 and 2 are the cylinders of a hydraulic drive for the table movement of a machine tool. These cylinders 1 and 2 are rigidly connected to the frame of a machine tool, not shown in the drawing, while the pistons 1' and 2' axially displaceable in the cylinders are attached to the table of the machine tool. The cylinders 1 and 2 are fed by two pumps 3 and 4. One (4) of these pumps is in direct communication, via the ducts 5 and 6, with the cylinders 1 and 2, whereas a slide 7 is interposed between the pump 3 and the cylinders 1 and 2.

As can be seen from the drawing, the two pumps 3 and 4 are formed as rotary pumps. The regulation of the quantity delivered by these pumps is effected by displacing the casing parts 8 and 9 relatively to the rotating parts 10 and 11, respectively. If the rotating parts 10 and 11 are driven in a clockwise direction, the pumps deliver from the ducts 12 and 5 into the ducts 13 and 6 respectively and therefore from the cylinder 1 into the cylinder 2. This state is shown in Figure 1. If the casing parts 8 and 9 are displaced to the left, the pump passes through a zero position, in which nothing whatsoever is delivered, into the position shown in Figure 2, in which delivery takes place from the ducts 13 and 6 into the ducts 12 and 5 respectively. The ducts 12 and 13 are short-circuited by means of the slide, which is displaced simultaneously with the control movement of the pumps, as will be described in greater detail hereinafter, so that the fluid is by-passed from the pump outlet to the pump inlet. The manner in which the casing parts 8 and 9 are mounted for movement relative to the conduits 5, 6, 12 and 13 is similar to that illustrated in Figs. 3 and 4.

In the embodiment illustrated, the casing parts 8 and 9 are coupled together in such a manner that during the regulation of the quantity conveyed they are displaced through equal distances. Regulation is effected, through the intermediary of a rod system 14, 15, by a control mechanism of which only a driven pinion 16 is shown in the drawings. This control mechanism is set in operation, in a manner known per se, by the movement of the machine tool table itself.

In the position shown in Figure 1, both of the pumps 3 and 4 deliver through the ducts 13 and 6 respectively into the cylinder 2 and thereby force the piston 2' out of the cylinder, so that the machine tool table moves in the direction of the arrow 17. After the pumps have been reversed, by control mechanism set in operation by the machine tool table, so that they are in the positon shown in Figure 2, the movement of the machine tool table is reversed. Simultaneously with the reversal of the pumps, the slide 7 also is displaced in such a manner that its pistons 18 and 19 shut the ducts 12 and 13 off from the ducts 20 and 21. As a result of this, the pump 3 is now idling, since the ducts 12 and 13 are in direct communication with one another via the space 22 between the pistons 18 and 19 of the slide 7. The movement of the table is therefore effected only by the pump 4, which now forces the pressure liquid from the duct 6 into the duct 5 and therefore into the cylinder 1, so that the piston 1' is forced back and the machine tool table is now moved in the direction of the arrow 23. This direction of movement corresponds to the working stroke of the machine table. Since now only one pump, i. e. the pump 4, is operative, the machine table can be moved at a slower speed and nevertheless when a stress occurs, for instance when the tool engages the workpiece, no appreciable reduction of speed will take place, since the increase of pressure due to the stress does not cause the slip to increase to the same extent as if only one large pump were provided of which the dimensions were sufficiently great to give the combined output of the two pumps 3 and 4. On the other hand, for the return movement of the work table, described at the outset, in the direction of the arrow 17, the full output of both pumps is available, so that the return movement can take place at a higher speed.

The invention also provides that the rod system for the movement of the slide 7 is to be so formed that it can be either coupled with the control mechanism effecting the reversal of the pumps, or rendered stationary, according to requirements. This construction is shown in further detail in Figures 3 and 4. The construction of the hydraulic drive shown in these figures therefore corresponds to that according to Figures 1 and 2. The same parts are therefore allotted the same reference numerals. Each of the casing parts 8 and 9 is slidably mounted in a bore 8' and 9' respectively and such parts include surfaces 12' and 13' and 5' and 6' which embrace and coact with the ends of the conduits 12 and 13 and 5 and 6 to provide a fluid tight seal. Figures 3 and 4 however show in a simplified manner a servo-motor 24 of the control mechanism, which motor is fed through the ducts 25 and 26. Its piston 27 acts, through the intermediary of the piston rod 28 and a link 29, on the rod 14 which is supported at 30 and transmits the movement of the stroke of 27, with a corresponding transmission ratio, to the casing parts 8 and 9 of the pumps 3 and 4. In the position shown in Figure 3 the rod 14 engages in a coupling head 31 of a pivoted lever 32 supported at 33 on a toothed rack 34. The teeth 34' of the rack 34 engage a pinion 35 which at the same time meshes also with the teeth 36 of the slide rod 37 of the slide 7, so that when the piston 27 of the servo-motor 24 moves the rack 7 is also moved until it assumes the position shown in dot-dash lines and shuts off the pump 3. In the arrangement shown in Figure 3, therefore, in one stroke direction both pumps are operative (return movement) whereas in the other direction the pump 3 is shut off by the slide 7 and idles, so that the movement of the planing machine table is produced by the pump 4 only (working stroke).

In contradistinction thereto, in the position shown in Figure 4 the pivoted lever 32 is released from engagement with the rod 14. Said lever has a projection 38 engaging in a recess 39 in the casing 40 of the servo-motor 24 and therefore locks the slide 7 in the position shown in the drawing, in which it allows free communication between the ducts 12 and 20, and the ducts 13 and 21. The servo-motor now acts only on the casing parts 8 and 9 of the pumps 3 and 4, and does not act on the slide 7. Therefore, both pumps are operatively connected to the cylinders 1 and 2 for both directions, both for the working stroke and also for the return movement.

In the example illustrated, the two pumps 3 and 4 are equally powerful, i. e. both are the same size. Alternatively however it is possible to make the power of the two pumps different, and more particularly to make the pump 3, which at times has its fluid by-passed from the outlet to the inlet, larger than the pump 4 which is permanently in communication with the cylinders 1 and 2.

The arrangement according to the invention not only removes the great reduction of speed at low table speeds, but also renders possible a substantial saving of power.

I claim:

1. A hydraulic drive system for machine tools of the type having a reciprocating work table comprising in combination two pumps having respective spaced rotors and casings and connected to deliver a fluid, means connected to said work table to receive said fluid, means to simultaneously change the spacing between the said respective rotors and casings to regulate the quantity and direction of fluid flow to said receiving means and further means to disconnect one of said pumps from the fluid receiving means.

2. A hydraulic drive system for machine tools of the type having a reciprocating work table comprising in combination a plurality of pumps connected to deliver a fluid, each said pump having a casing and a rotor within and spaced from said casing, means to receive said fluid to drive said work table, means to vary the spacing between the said rotors and casings to regulate the quantity and direction of fluid flow to said receiving means and further means to disconnect one of said pumps from the fluid receiving means.

3. The system according to claim 2 including individual passages communicating between the said pumps and the said fluid receiving means, and wherein the said further means includes means to seal the passages of one of said pumps to thereby disconnect the one said pump from the said fluid receiving means and connect the pump outlet to the pump inlet.

4. The system according to claim 3 wherein the said casings and rotors for each said pump are rigidly connected together whereby the said spacing is the same.

5. The system according to claim 4 wherein the said one said pump is larger than the remaining pump.

6. A pumping system connected to deliver fluid to a receiver, said system comprising two pumps each having respective casings and rotors spaced therefrom, conduits connecting said pumps and said receiver, and means to vary the spacing between said casings and rotors to regulate the fluid flow, said last named means comprising means to move said casings radially of the respective rotors, and means movable therewith to seal the conduits of one of said pumps to disconnect the same from said receiver and by-pass the fluid flow through said one of said pumps.

7. The system according to claim 6 wherein the radial motion of the said casings changes the direction of fluid flow of the pump connected to the said receiver when the other pump is disconnected therefrom.

References Cited in the file of this patent

UNITED STATES PATENTS

| | | | |
|---|---|---|---|
| 1,725,489 | Stratton | Aug. 20, | 1929 |
| 1,848,006 | Ferris | Mar. 1, | 1932 |
| 1,970,530 | West | Aug. 14, | 1934 |